(12) United States Patent
Jang (10) Patent No.: US 7,706,406 B2
(45) Date of Patent: Apr. 27, 2010

(54) DATA TRANSMISSION IN A MOBILE TELECOMMUNICATION SYSTEM

(75) Inventor: Sung-kyung Jang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 949 days.

(21) Appl. No.: 10/715,421

(22) Filed: Nov. 19, 2003

(65) Prior Publication Data

US 2004/0100919 A1 May 27, 2004

(30) Foreign Application Priority Data

Nov. 22, 2002 (KR) .................. 10-2002-0073207

(51) Int. Cl.
*H04J 3/16* (2006.01)
(52) U.S. Cl. .............. 370/469; 370/336; 370/349; 370/464
(58) Field of Classification Search ........... 370/329, 370/335, 338, 341, 348, 349
See application file for complete search history.

(56) References Cited

U.S. PATENT DOCUMENTS

| 6,333,789 | B1 * | 12/2001 | Shima ............... 358/1.15 |
| 6,944,178 | B1 * | 9/2005 | Charriere et al. ......... 370/444 |
| 2002/0071407 | A1 * | 6/2002 | Koo et al. .............. 370/335 |
| 2002/0085531 | A1 * | 7/2002 | Herrmann et al. ......... 370/338 |
| 2002/0097695 | A1 | 7/2002 | Herrmann | |
| 2002/0137521 | A1 | 9/2002 | Kim et al. | |
| 2003/0007517 | A1 | 1/2003 | Beckmann et al. | |
| 2004/0085932 | A1 * | 5/2004 | Jiang ................. 370/332 |
| 2005/0207388 | A1 * | 9/2005 | Rinne et al. ............. 370/347 |
| 2008/0144571 | A1 * | 6/2008 | Marinier et al. .......... 370/329 |

FOREIGN PATENT DOCUMENTS

| CN | 1270746 A | 10/2000 |
| DE | 101 07 700 A1 | 8/2002 |
| JP | 2000-201383 | 7/2000 |
| JP | 2002-026991 | 5/2001 |
| JP | 2002-204257 | 7/2002 |
| KR | 10-2001-0008734 | 2/2001 |
| KR | 10-2002-0038181 | 5/2002 |
| WO | WO02/51101 | 6/2002 |
| WO | WO02/065675 | 8/2002 |
| WO | WO 02/091633 | 11/2002 |

OTHER PUBLICATIONS

Chinese Office Action Dated Jun. 17, 2005 (along with an English translation of the Chinese Office Action.
Japanese Office Action Dated Dec. 1, 2005.
European Search Report dated Sep. 5, 2006.

\* cited by examiner

*Primary Examiner*—Patrick N Edouard
*Assistant Examiner*—Dai A Phuong
(74) *Attorney, Agent, or Firm*—KED & Associates, LLP (57) ABSTRACT

A data transmission method is provided for a medium access control (MAC) of a mobile telecommunication system. Each logical channel may transmit a response field to the transport channel. The response field may represent a data characteristic and an amount of data having a corresponding characteristic. This may be transmitted with the response field representing a data amount of a buffer. The transport channel may perform a TFC selection based on priorities of each logical channel and the data characteristic.

11 Claims, 7 Drawing Sheets

FIG. 1
RELATED ART

PRIMITIVES BETWEEN MAC LAYER AND RLC LAYER

| GENERIC NAME | REQUEST | INDICATION | RESPONSE | CONFIRM |
|---|---|---|---|---|
| MAC_DATA | DATA, BO, UE-ID TYPE INDICATOR, RLC ENTITY INFO | DATA, NO_TB, TD (NOTE), ERROR INDICATION | | |
| MAC_STATUS | | NO_PDU, PDU_SIZE, TX STATUS | BO, RLC ENTITY INFO | |
| NOTE: TDD ONLY. | | | | |

PRIMITIVES BETWEEN MAC LAYER AND RLC LAYER

| GENERIC NAME | REQUEST | INDICATION | RESPONSE | CONFIRM |
|---|---|---|---|---|
| MAC_DATA | DATA, BO, UE-ID TYPE INDICATOR, RLC ENTITY INFO | DATA, NO_TB, TD (NOTE), ERROR INDICATION | | |
| MAC_STATUS | | NO_PDU, PDU_SIZE, TX STATUS | BO, RLC ENTITY INFO IS RETRANSMITTED, NUM OF RETRANSMITTED | |
| NOTE: TDD ONLY. | | | | |

DATA TRANSMISSION IN A MOBILE TELECOMMUNICATION SYSTEM

BACKGROUND OF THE INVENTION

1. Field of the Invention

Embodiments of the present invention relate to a mobile telecommunication system. More particularly, embodiments of the present invention relate to a data transmission on a medium access control (MAC) layer.

2. Background of Related Art

A medium access control (MAC) layer of IMT-2000 may be coupled to a physical (PHY) layer, a radio link control (RLC) layer, and a radio resource control (RRC) layer. The MAC may transmit data generated from a plurality of upper layers to a lower layer through an allocated transport channel. More specifically, the MAC may select a suitable transport channel for a data transmission request of each upper layer. The MAC may efficiently allocate a transmission amount to a plurality of logical channels mapped with a transport channel.

Each of the plurality of logical channels mapped with the one transport channel may have a priority. The MAC may perform a transport format combination (TFC) selection process in which data of the logical channel having a highest priority is transmitted. The TFC of the MAC layer may be controlled by the RRC layer.

Retransmission requests may be sent when all the data has not been properly transmitted. However, in disadvantageous arrangements, data at a specific logical channel may not respond to a re-transmission request and therefore the transmitting system may become deadlocked.

SUMMARY OF THE INVENTION

Embodiments of the present invention may solve at least the above problems and/or disadvantages and to provide at least the advantages described hereinafter.

Embodiments of the present invention may provide a data transmission method on a MAC layer of a mobile telecommunication system capable of stably transmitting data by performing a TFC selection process based on priority of logical channels and a characteristic of data to be transmitted.

Embodiments of the present invention may provide a data transmission method in a radio system that matches data of a plurality of logical channels to one transport channel. The method may include receiving information relating to a data amount of a buffer and a characteristic of data to be transmitted from each logical channel. The method may also include selecting data from a specific logical channel based on priorities of each channel and the data characteristic. For example, the data characteristic may represent whether re-transmission data exists or whether the re-transmission data does not exist. The existence of re-transmission data may be represented by a "True" indication. The absence of re-transmission data may be represented by a "False" indication.

Information of each logical channel may be included in a MAC_STATUS_RESP Primitive that is transmitted to the transport layer. That is, the MAC_STATUS_RESP Primitive may include information representing an amount of re-transmission data. The selecting of the data of a specific logical channel may include judging whether a logical channel includes re-transmission data and selecting logical channels based on priorities of corresponding logical channels if the logical channels include re-transmission data. The judging whether a logical channel includes re-transmission data may be based on a "True" indicator or a "False" indicator.

Embodiments of the present invention may also provide a data transmission method in a radio system by matching data of a plurality of logical channels having respective priorities to one transport channel. Data of a specific logical channel may be selected by the transport channel and transmitted according to a priority of each logical channel and whether re-transmission data exists.

A logical channel having re-transmission data may be endowed with a higher priority than another logical channel that does not have any re-transmission data. Thereby data of the logical channel having the re-transmission data may be transmitted first. If there is a plurality of logical channels having re-transmission data, then the selection of a specific logical channel may be based on priorities of corresponding logical channels. If a logical channel having re-transmission data does not exist, then the selection of a specific logical channel may be based on priorities of each logical channel.

Additional advantages, objects, and features of the invention will be set forth in part in the description that follows and in part will become apparent to those having ordinary skill in the art upon examination of the following or may be learned from practice of the invention.

BRIEF DESCRIPTION OF THE DRAWINGS

The accompanying drawings illustrate arrangements and embodiments of the present invention and serve to explain principles of the invention. In the following drawings, like reference numerals represent like elements and wherein.

DETAILED DESCRIPTION OF PREFERRED EMBODIMENTS

Figure 1:
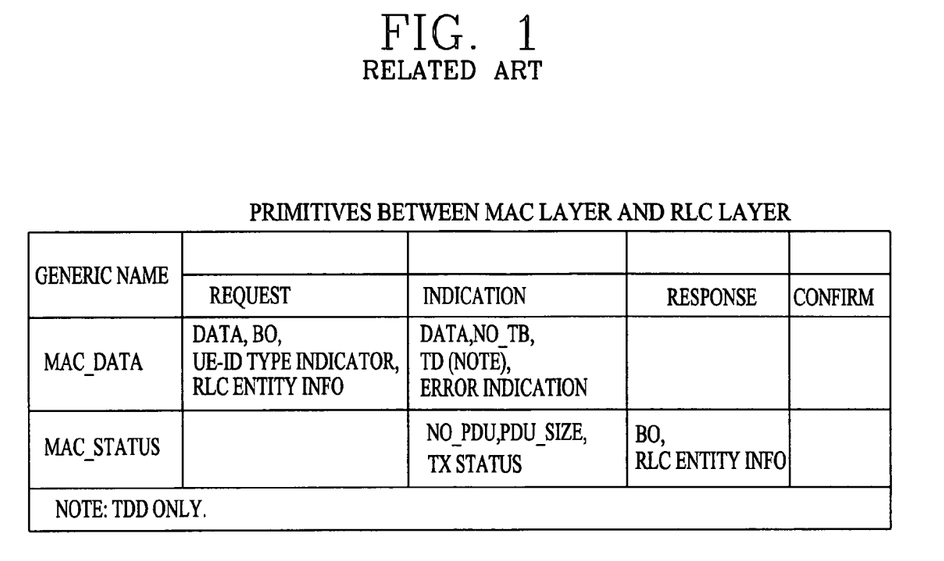
FIG. 1 is a view showing primitives between a MAC layer and an RLC layer according to one arrangement.

FIG. 1 is a view showing primitives between a MAC layer and an RLC layer according to one arrangement. Other arrangements are also possible. As shown, each logical channel and transport channel may exchange a MAC_DATA Primitive and a MAC_STATUS Primitive between a MAC layer and an RLC layer for exchanging data to be transmitted. A primitive for exchanging transmission/reception information between an upper layer and a lower layer as an order form and a data form may provide a request, an indication, a response, a confirm, etc. between the upper layer and the lower layer.

A MAC_DATA_IND Primitive may be used when data in a current buffer of a selected logical channel is required to be transmitted after the MAC TFC selection process. The logical channel may transmit protocol data units (PDU) to the transport channel using a MAC_DATA_REQ Primitive according to the request.

A MAC_STATUS_IND Primitive may be used such that the transport channel informs each logical channel of a size and a number of PDUs transmittable in the logical channel. A MAC_STATUS_RESP Primitive may be used so that each logical channel informs the transport channel of a data amount in a current buffer.

Figure 2:
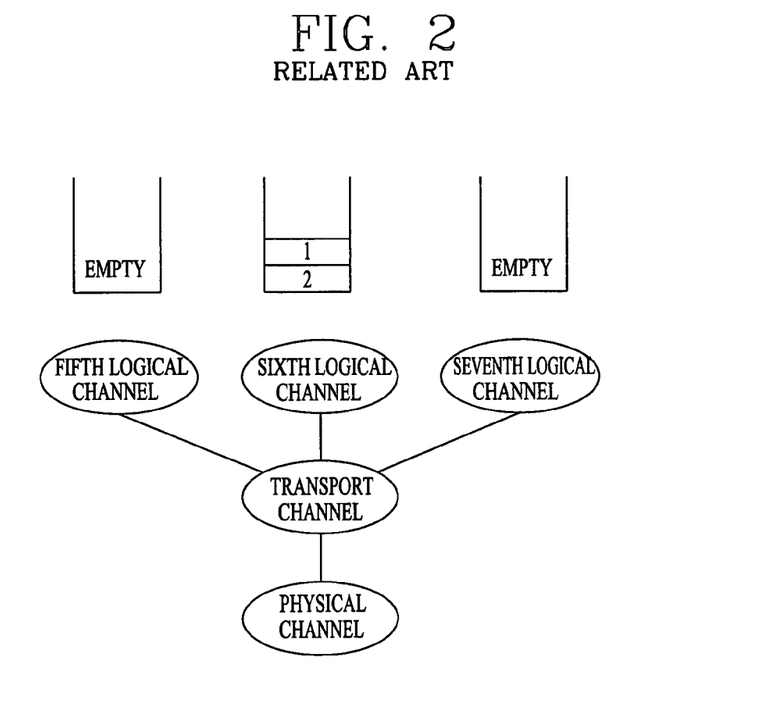
FIG. 2 shows a mapping relation between a logical channel and a transport channel according to one arrangement.

FIG. 2 shows a mapping relation between logical channels and a transport channel according to one arrangement. Other arrangements are also possible. As shown, a transport channel is connected with a physical channel at a ratio of one to one. Additionally, the transport channel is mapped to three logical channels.

Figure 3:
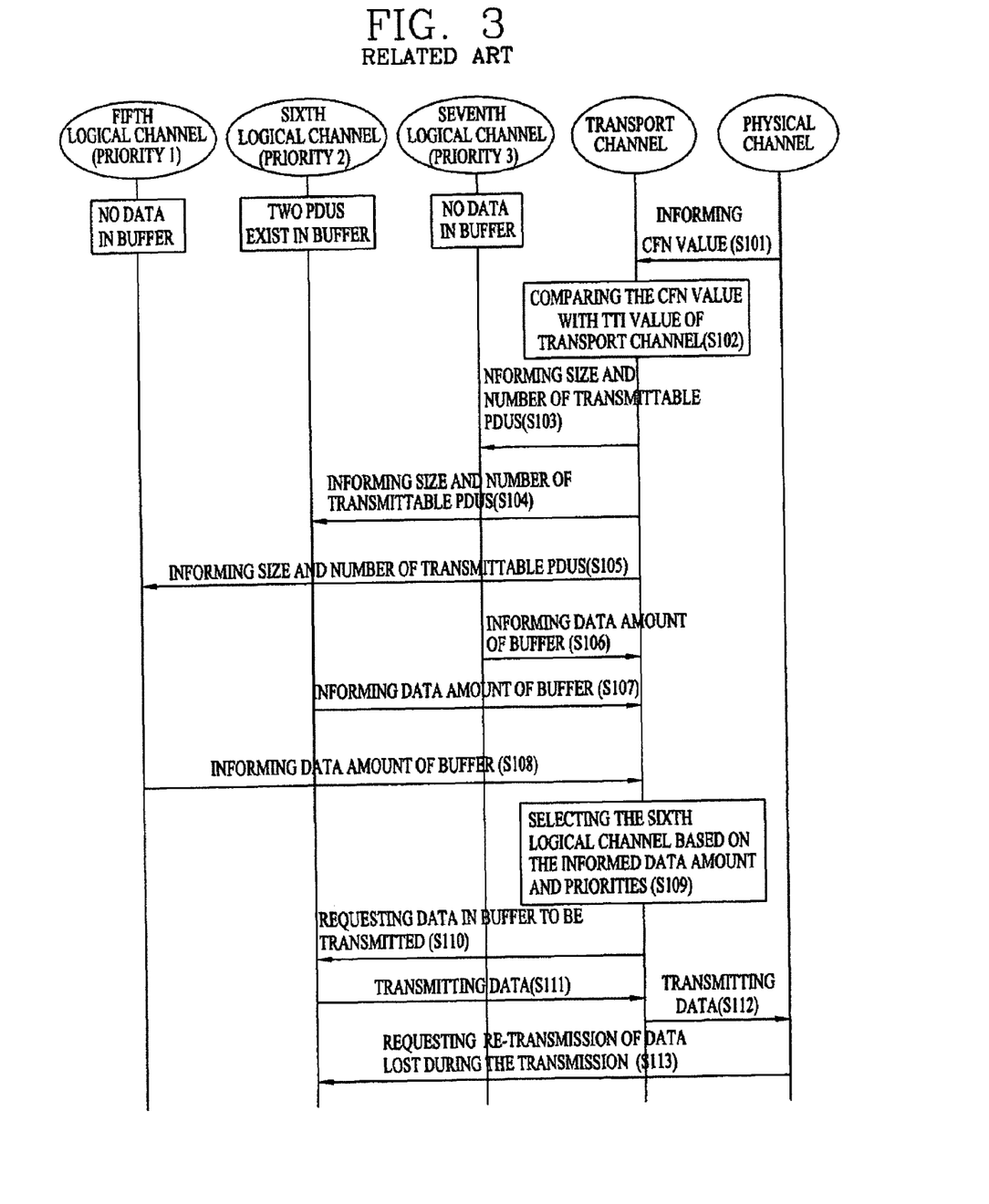
FIG. 3 is a flow chart showing a data transmission method on a MAC layer according to one arrangement.

An example data transmission method on a MAC layer will now be described with respect to FIGS. 3 and 4. FIG. 3 is a flow chart showing a data transmission method on a MAC layer according to one arrangement. Other arrangements are also possible. As shown, each logical channel has a priority. For example, a fifth logical channel has a Priority 1, a sixth logical channel has a Priority 2, and a seventh logical channel has a Priority 3. The sixth logical channel may also have two PDUs in a buffer and the fifth and seventh logical channels may not have any data in buffers.

As shown, the physical channel may inform the transport channel of a connection frame number (CFN) value (S101). The transport channel then compares the CFN value with a transmission time interval (TTI) value (S102). If the two values are consistent with each other, then data transmission may be allowed. In order to perform the TFC selection process, the transport channel transmits a MAC_STATUS_IND Primitive (S103-S105) to each logical channel (i.e., the fifth through seventh logical channels) including a PDU_size response field and a No_PDU field. The PDU_size response field represents a size of currently transmittable PDUs. The No_PDU response field represents the number of transmittable PDUs. Each logical channel responds with a MAC_STATUS_RESP Primitive (S106-S108) to the transport channel. The MAC_STATUS_RESP Primitive includes a buffer occupancy (BO) response field representing an amount of data in the current buffer.

The transport channel performs the TFC selection process based on the data amount and the channel priority informed by each channel (S109). The transport channel may request data transmission from the logical channel having higher priority and more data to be transmitted. In this example, since two PDUs exist in the sixth logical channel and no data exists in the fifth and seventh logical channels, the transport channel requests data transmission from the sixth logical channel (S110). The sixth logical channel transmits two PDUs based on the request of the transport channel (S111). The transport channel may then transmit the two received PDUs (from the sixth logical channel) to a receiving end through the physical channel (S112).

If data loss occurs during the transmission, a re-transmission may be requested from a peer (S113). After the sixth logical channel receives the re-transmission request from the peer, data may be transmitted by a method such as shown in FIG. 4.

Figure 4:
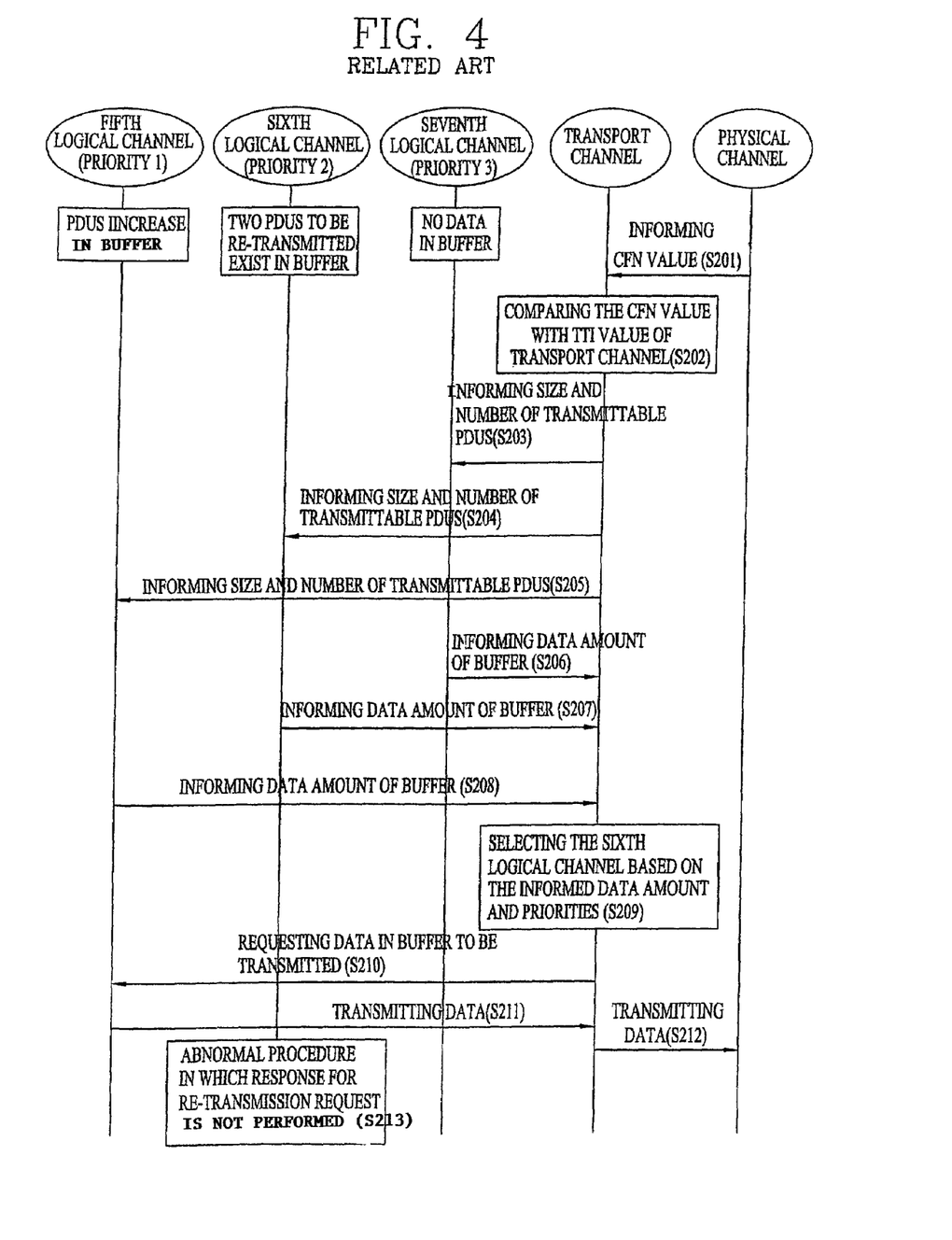
FIG. 4 is a flow chart showing a data transmission method on a MAC layer according to one arrangement.

As shown in FIG. 4, the physical channel informs the transport channel of a CFN value (S201). The transport channel compares the CFN value with a TTI value of the transport channel (S202). If the two values are consistent with each other, then a size and number of currently transmittable PDUs are informed to the logical channels using the MAC_STATUS_IND Primitive (S203-S205). Each logical channel responds to the transport channel using the MAC_STATUS_RESP Primitive (S206-S208). The response indicates a data amount of the respective internal buffers The transport channel performs a TFC selection process based on the data amount and channel priority. In this example, the transport channel performs the TFC selection process and selects the fifth logical channel which has the highest priority and the greatest data transmission amount (S209). The fifth logical channel having a higher priority than the sixth logical channel is requested to transmit the PDUs (S210). The PDUs of the fifth logical channel are input to the transport channel (S211) to be transmitted to the receiving end through the physical channel (S212).

When performing the MAC TFC selection process, data of the fifth logical channel having a higher priority is transmitted so that the sixth logical channel cannot respond to a re-transmission request. Therefore, a smooth data transmission does not always occur, and abnormal RLC procedures such as an RLC reset and an RLC SDU discard may be generated in the sixth logical channel (S213).

According to the above-described data transmission method on the MAC layer, data transmission may be performed based on priorities of the logical channels in the TFC selection process. Therefore, at the time of a re-transmission request, data of a specific logical channel cannot respond to the re-transmission request and the transmitting system may become deadlocked.

Embodiments of the present invention may provide a method for normal data transmission by performing a TFC selection process with reference to a response field representing a data characteristic.

Embodiments of the present invention may provide a radio data transmission method that includes receiving information corresponding to a data amount of a buffer and a characteristic of data to be transmitted from a plurality of logical channels. The method may also include selecting data to transmit from one of the logical channels based on priorities of each channel and the respective data characteristic of that channel.

Figure 5:
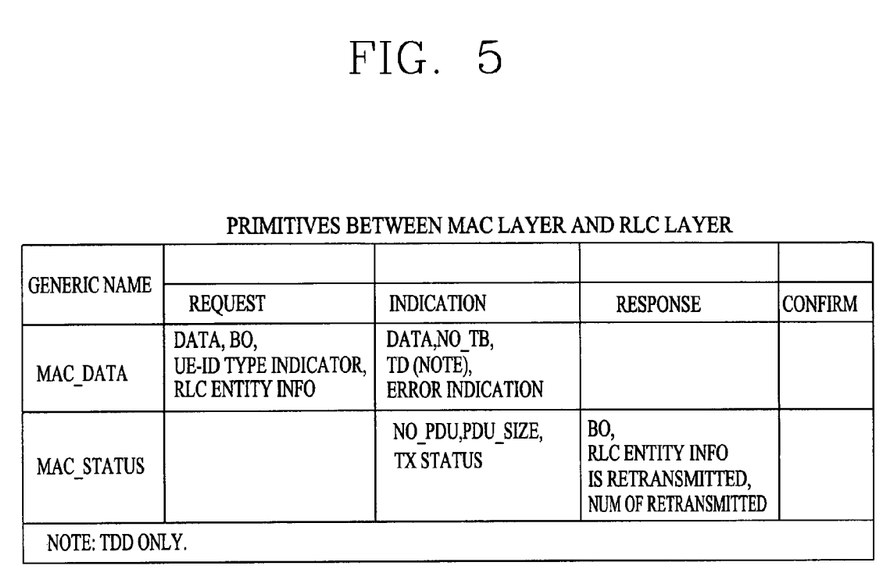
FIG. 5 shows primitives between a MAC layer and an RLC layer according to an example embodiment of the present invention.

FIG. 5 shows primitives between a MAC layer and a RLC layer according to an example embodiment of the present invention. Other embodiments are also within the scope of the present invention. As shown in FIG. 5, each logical channel responds to a received MAC_STATUS_IND Primitive by transmitting a MAC_STATUS_RESP Primitive including a data characteristic and a data amount to a transport channel. That is, each logical channel may transmit a MAC_STATUS_RESP Primitive including a response field (Is Retransmitted) representing whether re-transmission data is included in currently transmitted data or not, and a response field (Num of Retransmitted) representing a re-transmission data amount. The response field (Is Retransmitted) may include a "True" indication representing re-transmission data and a "False" indication representing no re-transmission data.

Figure 6:
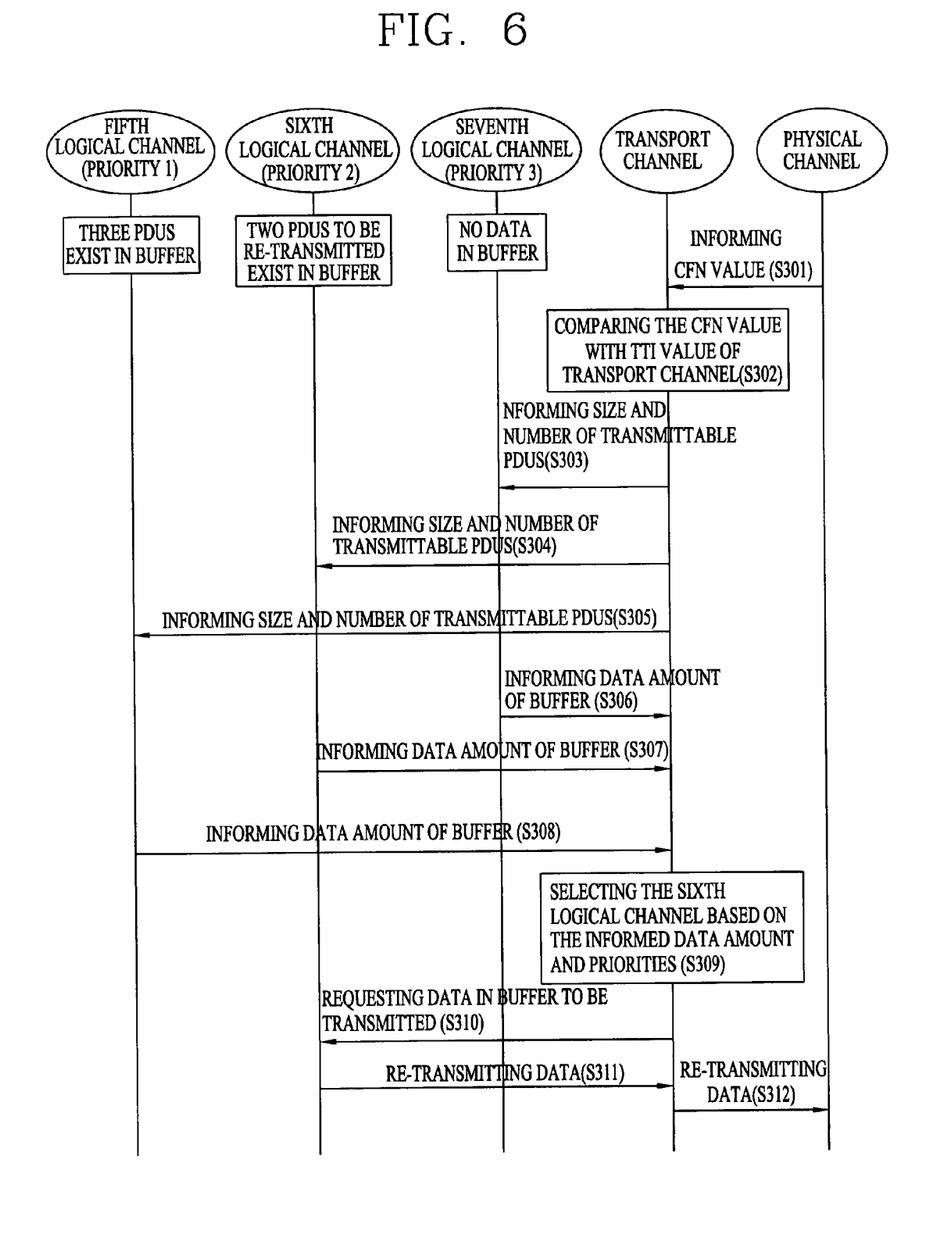
FIG. 6 is a flow chart showing a transmission method on a MAC layer according to an example embodiment of the present invention.

FIG. 6 is a flow chart showing a transmission method on a MAC layer according to an example embodiment of the present invention. Other operations, orders of operations and embodiments are also within the scope of the present invention.

In this example embodiment, three logical channels, namely a fifth logical channel, a sixth logical channel, and a seventh logical channel, are mapped to one transport channel. The fifth logical channel has a Priority 1, the sixth logical channel has a Priority 2, and the seventh logical channel has a Priority 3.

In this example, the sixth logical channel may have two PDUs in an internal buffer to be re-transmitted. The fifth logical channel may have three PDUs to be transmitted, and the seventh logical channel may not have any data to be transmitted in an internal buffer.

As shown, a physical channel may transmit a CFN value to a transport channel (S301). The transport channel compares the CFN value with a TTI value of the transport channel (S302). If the two values are consistent with each other, then data transmission to the physical channel is allowed. Therefore, the transport channel transmits a MAC_STATUS_IND Primitive to each logical channel (S303-S305). In response, each logical channel transmits a MAC_STATUS_RESP Primitive (S306-S308) to the transport channel. The MAC_STATUS_RESP Primitive may include a response field representing a data amount (buffer occupancy: BO) existing in a current logical channel, a response field (Is Retransmitted) representing whether data to be re-transmitted now exists, and a response field (Num of Retransmitted) representing an amount of data to be re-transmitted.

The transport channel may perform the TFC selection process based on the priorities and the data characteristics transmitted in the MAC_STATUS_RESP Primitive from each logical channel (S309). The TFC selection process may be performed so that logical channels having re-transmission data may have a higher priority than the other logical channels not having re-transmission data.

Stated differently, the transport channel may perform the TFC selection process by prioritizing re-transmission data. In this example, the transport channel requests (or selects) data transmission from the sixth logical channel since it has re-transmission data even though the fifth logical channel has a higher priority and more data than the sixth logical channel (S310). The re-transmission data may be forwarded from the sixth logical channel to the transport channel (S311) and the transport channel may forward the re-transmission data to the physical channel (S312).

Figure 7:
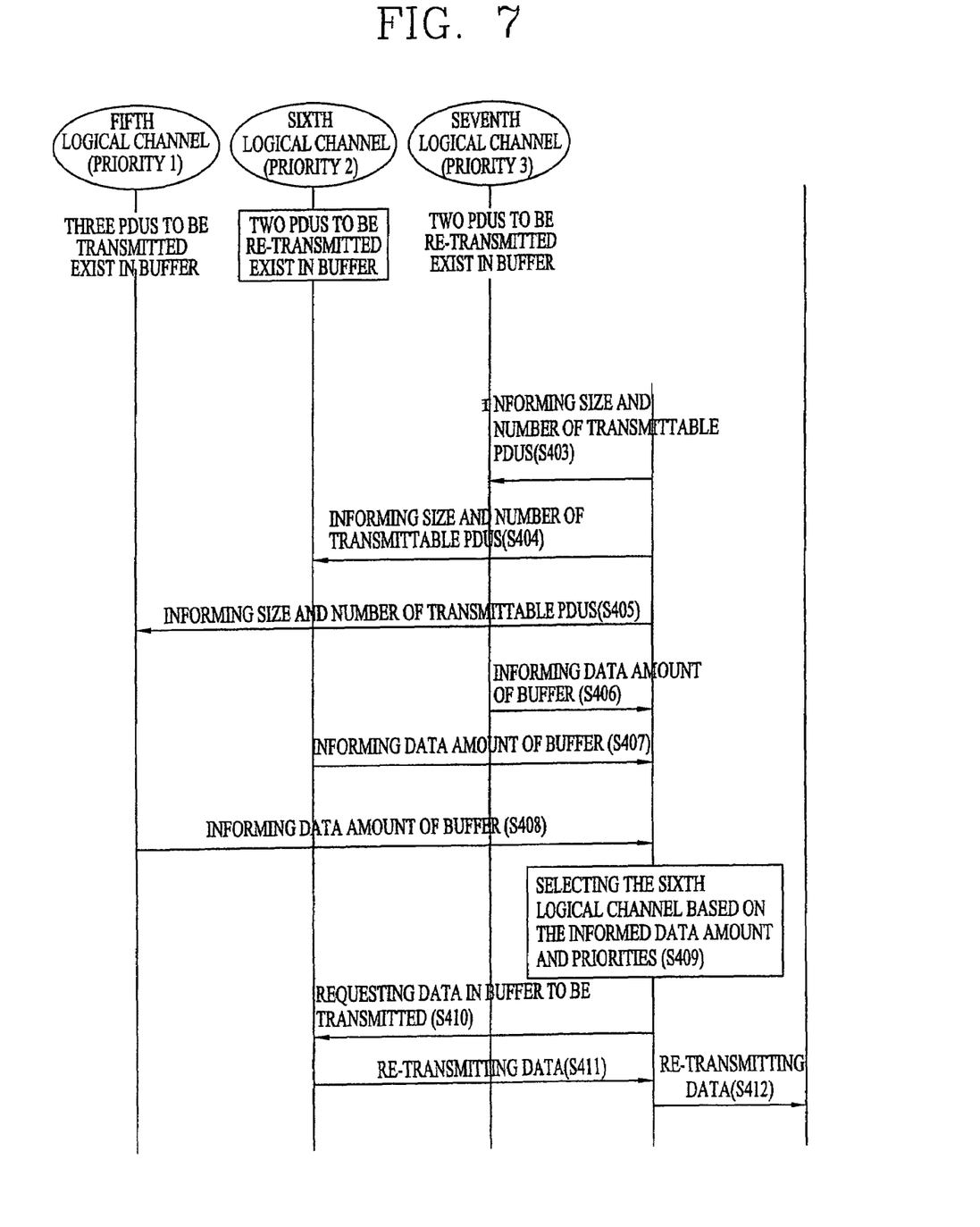
FIG. 7 is a flow chart showing a data transmission method on a MAC layer according to an example embodiment of the present invention.

FIG. 7 is a flow chart showing a data transmission method on a MAC layer according to an example embodiment of the present invention. Other operations, orders of operations and embodiments are also within the scope of the present invention.

In this example embodiment, three logical channels, namely a fifth logical channel, a sixth logical channel, and a seventh logical channel are mapped with one transport channel. The fifth logical channel has a Priority 1, the sixth logical channel has a Priority 2, and the seventh logical channel has a Priority 3.

In this example, the sixth logical channel and the seventh channel respectively have two PDUs in respective internal buffers to be re-transmitted, and the fifth logical channel has three PDUs in an internal buffer to be transmitted.

As shown, a physical channel transmits a CFN value to a transport channel (S401). The transport channel compares the CFN value with a TTI value of the transport channel (S402). If the two values are consistent with each other, then data transmission to the physical channel is allowed. Therefore, the transport channel transmits a MAC_STATUS_IND Primitive to each logical channel (S403-S405). In response, each logical channel transmits a MAC_STATUS_RESP Primitive (S406-S408) to the transport channel. The MAC_STATUS_RESP Primitive includes a response field representing a data amount (buffer occupancy: BO) existing in a current logical channel, a response field (Is Retransmitted) representing whether data to be re-transmitted now exists, and a response field (Num of Retransmitted) representing an amount of data to be re-transmitted.

The MAC_STATUS_RESP Primitive of each logical channel is transmitted (or forwarded) to the transport channel and the transport channel performs the TFC selection process based on priorities and at least one data characteristic. The TFC selection process may be performed so that a logical channel having data to be re-transmitted has a higher priority than another logical channel not having re-transmission data. Thereby, the data to be re-transmitted can be transmitted first. The data to be re-transmitted includes data that was previously partially sent from one of the logic channels to a transport channel. In this example, the TFC selection process selects data of a logical channel that includes data to be re-transmitted rather than selecting the fifth logical channel having a higher priority but no re-transmission data. Also, since a priority of the sixth logical channel is higher than a priority of the seventh logical channel and both channels include data to be re-transmitted, the TFC selection process selects data of the sixth logical channel to be transmitted (S409). Stated differently, when plural logical channels request a re-transmission at the same time, the transport channel performs the TFC selection process based on priorities of the logical channels.

Figure 8:
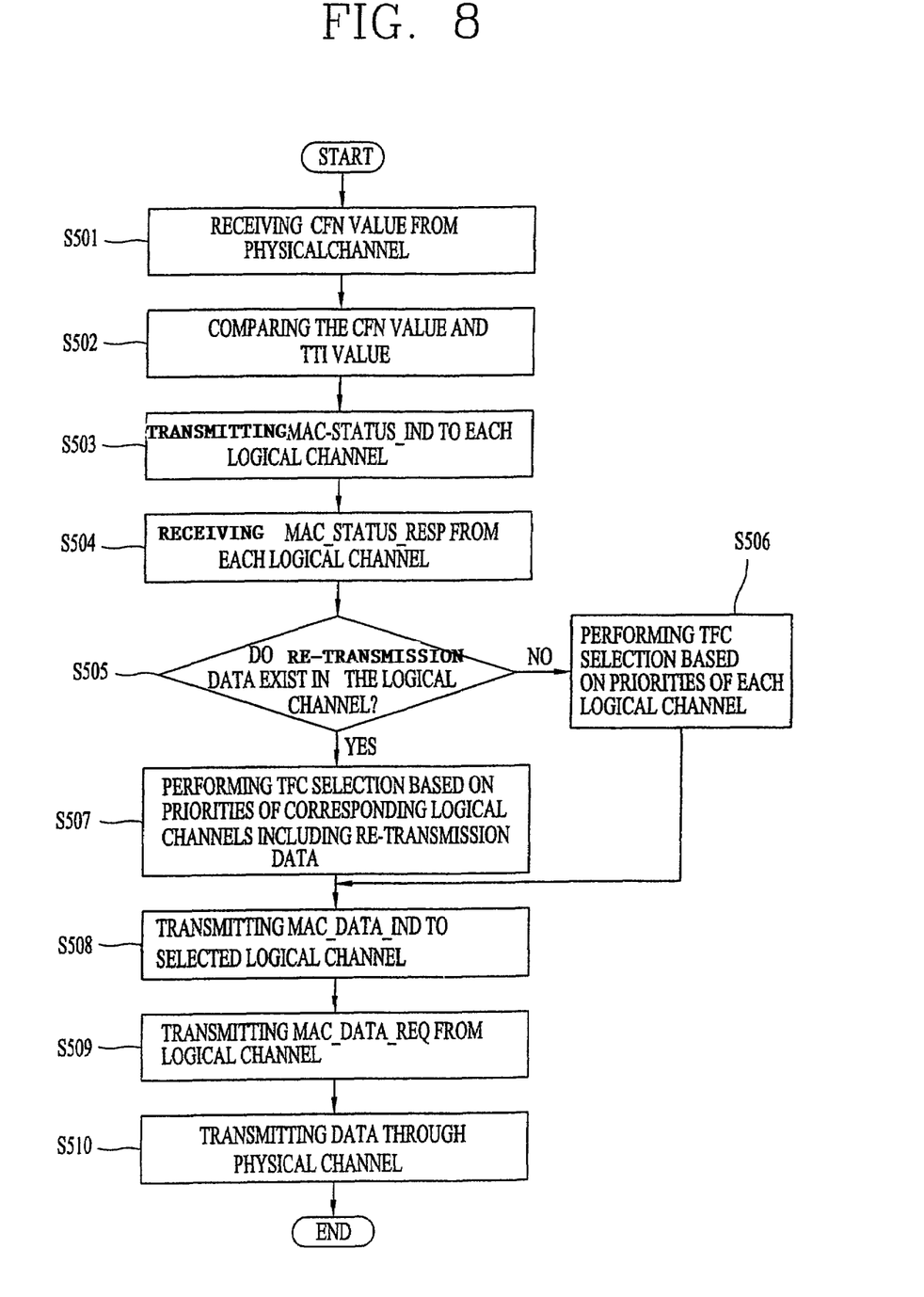
FIG. 8 is a flow chart showing a data transmission method on a MAC layer according to an example embodiment of the present invention.

FIG. 8 is a flow chart showing a data transmission method on a MAC layer according to an example embodiment of the present invention. Other operations, orders of operations and embodiments are also within the scope of the present invention.

As shown, a physical channel transmits a CFN value to a transport channel (S501). The transport channel compares the CFN value with a TTI value of the transport channel (S502). If the two values are consistent with each other, then data transmission of the physical channel is allowed. Therefore, the transport channel transmits a MAC_STATUS_IND Primitive to each logical channel (S503). In response, each logical channel transmits a MAC_STATUS_RESP Primitive (S404) to the transport channel. The MAC_STATUS_RESP Primitive includes a response field representing a data amount (buffer occupancy: BO) existing in a current buffer, a response field (Is Retransmitted) representing whether data to be re-transmitted now exists, and a response field (Num of Retransmitted) representing an amount of the data to be re-transmitted. The MAC_STATUS_RESP Primitive is received from each logical channel (S504).

The transport channel confirms from the MAC_STATUS_RESP Primitive whether the internal buffers of the respective logical channel includes any data to be re-transmitted (S505). If data to be re-transmitted does not exist, the TFC selection process is performed based on priorities of each logical channel (S506). If data to be re-transmitted exists, then the TFC selection process is performed based on priorities of each logical channel including re-transmission data (S507).

When the TFC selection is completed, the transport channel transmits the MAC_DATA_IND Primitive to the selected logical channel to request data transmission (S508). The logical channel responds to the MAC_DATA_IND Primitive by transmitting a MAC_DATA_REQ Primitive including data to the transport channel (S509). The transport channel may then transmit the data to a receiving end through the physical channel (S510).

Embodiments of the present invention may provide that when data of plural logical channels are to be transmitted to the physical channel through one transport channel on the MAC layer, the TFC selection is performed based not only on the priorities of the logical channels but also based on at least a data characteristic of the channel.

Embodiments of the present invention may be embodied in several forms without departing from the spirit or essential characteristics thereof. It should also be understood that the above-described embodiments are not limited by any of the details of the foregoing description, but rather should be construed broadly within its spirit and scope as defined in the appended claims, and therefore all changes and modifications that fall within the metes and bounds of the claims, or equivalence of such metes and bounds are therefore intended to be embraced by the appended claims. The description of the present invention is intended to be illustrative, and not to limit the scope of the claims. Many alternatives, modifications, and variations will be apparent to those skilled in the art.

What is claimed is:

1. A method of transmitting data in a wireless communication system, the method comprising:
   receiving information corresponding to a data amount of each buffer of a plurality of logical channels and a characteristic of data to be transmitted from each of a plurality of logical channels, wherein the characteristic of data indicates whether or not the data is a re-transmission data; and
   selecting data to transmit from one of the plurality of logical channels based on the received information, wherein the selecting the data comprises:
      determining which ones of the plurality of logical channels include the re-transmission data in a buffer corresponding to a specific logical channel; and
      after the determining which ones of the logical channels include the re-transmission data,
         when each buffer of the plurality of logical channels does not have the re-transmission data, selecting one of the plurality of logical channels based on priorities of each of the logical channels,
         when one or more buffers of the plurality of logical channels have the re-transmission data, selecting one of the plurality of logical channels among the plurality of logical channels having the re-transmission data, wherein the selected logical channel has a highest priority among the plurality of logical channels having the re-transmission data; and
      sending the data to a transport channel.

2. The method of claim 1, wherein determining which ones of the plurality of logical channels includes re-transmission data in the corresponding buffer is based on one of a True indication and a False indication.

3. The method of claim 1, wherein the information from each of the plurality of logical channels are sent to the transport channel, and the information comprises a MAC_STATUS_RESP Primitive.

4. The method of claim 3, wherein the MAC_STATUS_RESP Primitive includes information regarding existence of re-transmission data in a buffer corresponding to the logical channel.

5. The method of claim 3, wherein the MAC_STATUS_RESP Primitive includes information representing an amount of the re-transmission data in a buffer corresponding to the logical channel.

6. An apparatus of transmitting data in a wireless communication system, the apparatus comprising:
   a radio protocol entity adapted to:
   receive information corresponding to a data amount of each buffer of a plurality of logical channels and a characteristic of data to be transmitted from each of the plurality of logical channels, wherein the characteristic of data indicates whether or not the data is a retransmission data,
   select data to transmit from one of the plurality of logical channels based on the received information,
   wherein to select the data comprises:
      determining which ones of the plurality of logical channels include the re-transmission data in a buffer corresponding to a specific logical channel;
      after determining which ones of the logical channels include the re-transmission data,
         selecting one of the plurality of logical channels based on priorities of each of the logical channels when each buffer of the plurality of logical channels does not have the retransmission data,
         selecting one of the plurality of logical channels among the plurality of logical channels having the retransmission data when one or more buffers of the plurality of logical channels have the retransmission data, wherein the selected logical channel has a highest priority among the plurality of logical channels having the retransmission data; and
      send the data to a transport channel.

7. The apparatus of claim 6, wherein determining which ones of the plurality of logical channels includes re-transmission data in the corresponding buffer is based on one of a True indication and a False indication.

8. The apparatus of claim 6, wherein the information from each of the plurality of logical channels are sent to the transport channel, and the information comprises a MAC_STATUS-RESP Primitive.

9. The apparatus of claim 8, wherein the MAC_STATUS_RESP Primitive includes information regarding existence of re-transmission data in a buffer corresponding to the logical channel.

10. The apparatus of claim 8, wherein the MAC_STATUS_RESP Primitive includes information representing an amount of the re-transmission data in a buffer corresponding to the logical channel.

11. The apparatus of claim 6, wherein the radio protocol entity is a Medium Access Control (MAC) layer.

* * * * *